United States Patent
Min et al.

(10) Patent No.: US 9,057,828 B2
(45) Date of Patent: Jun. 16, 2015

(54) MULTI-PORT LIGHT SOURCES OF PHOTONIC INTEGRATED CIRCUITS

(75) Inventors: Bok-ki Min, Suwon-si (KR); Taek Kim, Seongnam-si (KR); Young-soo Park, Yongin-si (KR)

(73) Assignee: SAMSUNG ELECTRONICS CO., LTD. (KR)

( * ) Notice: Subject to any disclaimer, the term of this patent is extended or adjusted under 35 U.S.C. 154(b) by 0 days.

(21) Appl. No.: 13/534,728

(22) Filed: Jun. 27, 2012

(65) Prior Publication Data

US 2013/0105840 A1 May 2, 2013

(30) Foreign Application Priority Data

Nov. 2, 2011 (KR) ................... 10-2011-0113582

(51) Int. Cl.
*G02B 6/34* (2006.01)
*H01L 33/00* (2010.01)
*G02B 6/12* (2006.01)
*G02B 6/122* (2006.01)

(52) U.S. Cl.
CPC .......... *G02B 6/12004* (2013.01); *G02B 6/1228* (2013.01); *G02B 2006/12121* (2013.01)

(58) Field of Classification Search
CPC ........... G02B 6/02085; G02B 6/02138; G02B 6/022; G02B 6/12007; G02B 6/124; H01L 33/20; H01L 33/44; H01L 33/54; H01L 33/60; H01L 33/62

USPC ................................................. 385/37; 257/98
See application file for complete search history.

(56) References Cited

U.S. PATENT DOCUMENTS

| | | | | |
|---|---|---|---|---|
| 2006/0138433 | A1* | 6/2006 | Joyner et al. | 257/79 |
| 2009/0304325 | A1* | 12/2009 | Lee et al. | 385/14 |
| 2010/0142567 | A1* | 6/2010 | Ward et al. | 372/20 |
| 2011/0280533 | A1* | 11/2011 | Chang-Hasnain et al. | 385/131 |
| 2012/0008658 | A1* | 1/2012 | Chung | 372/45.01 |

FOREIGN PATENT DOCUMENTS

| | | | |
|---|---|---|---|
| JP | 2001148531 | A | 5/2001 |
| JP | 2005159071 | A | 6/2005 |
| JP | 2007-080934 | A | 3/2007 |
| JP | 2008046546 | A | 2/2008 |
| JP | 2009-296018 | A | 12/2009 |
| KR | 10-2008-0052233 | A | 6/2008 |
| KR | 20090064951 | A | 6/2009 |
| WO | WO 2010/091688 | A1 | 8/2010 |

\* cited by examiner

*Primary Examiner* — Jerry Blevins
(74) *Attorney, Agent, or Firm* — Harness, Dickey & Pierce, PLC

(57) ABSTRACT

A multi-port light source of a photonic integrated circuit (PIC) may include a light emission portion for generating light; and a plurality of waveguides on opposite sides of the light emission portion to guide the light. A multi-port light source of a photonic integrated circuit (PIC) may include a first layer including a first pattern and a second pattern that are different from each other; an insulating layer on at least a region of the first layer; an active layer on at least a region of the insulating layer; and a reflective layer on the active layer.

20 Claims, 7 Drawing Sheets

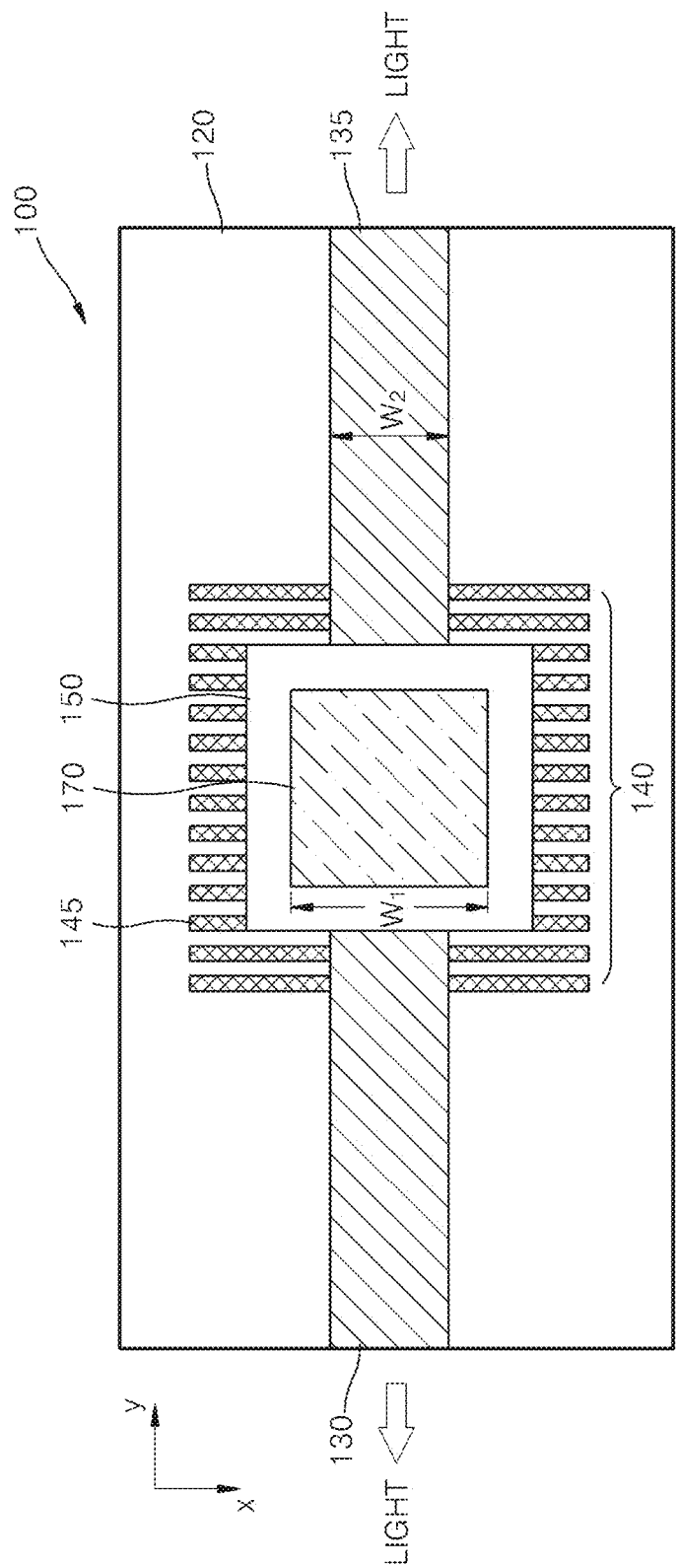

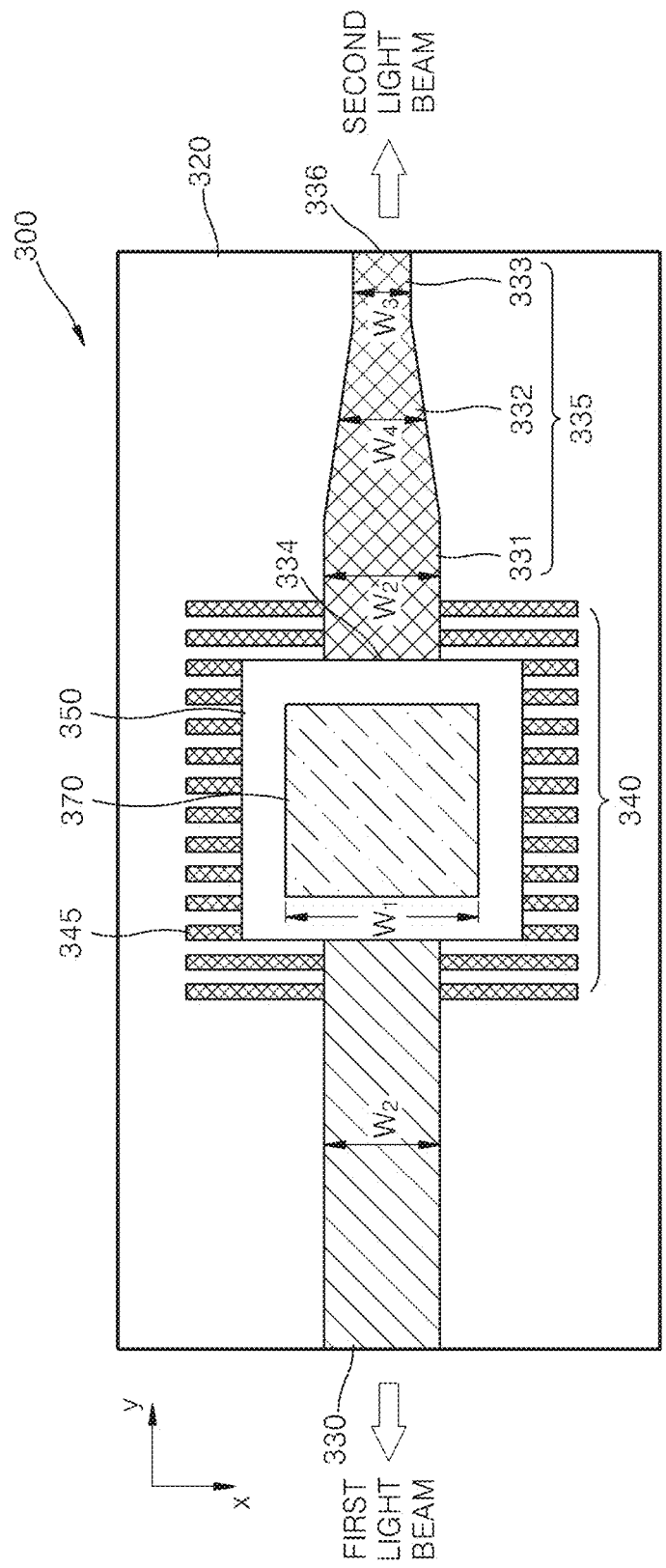

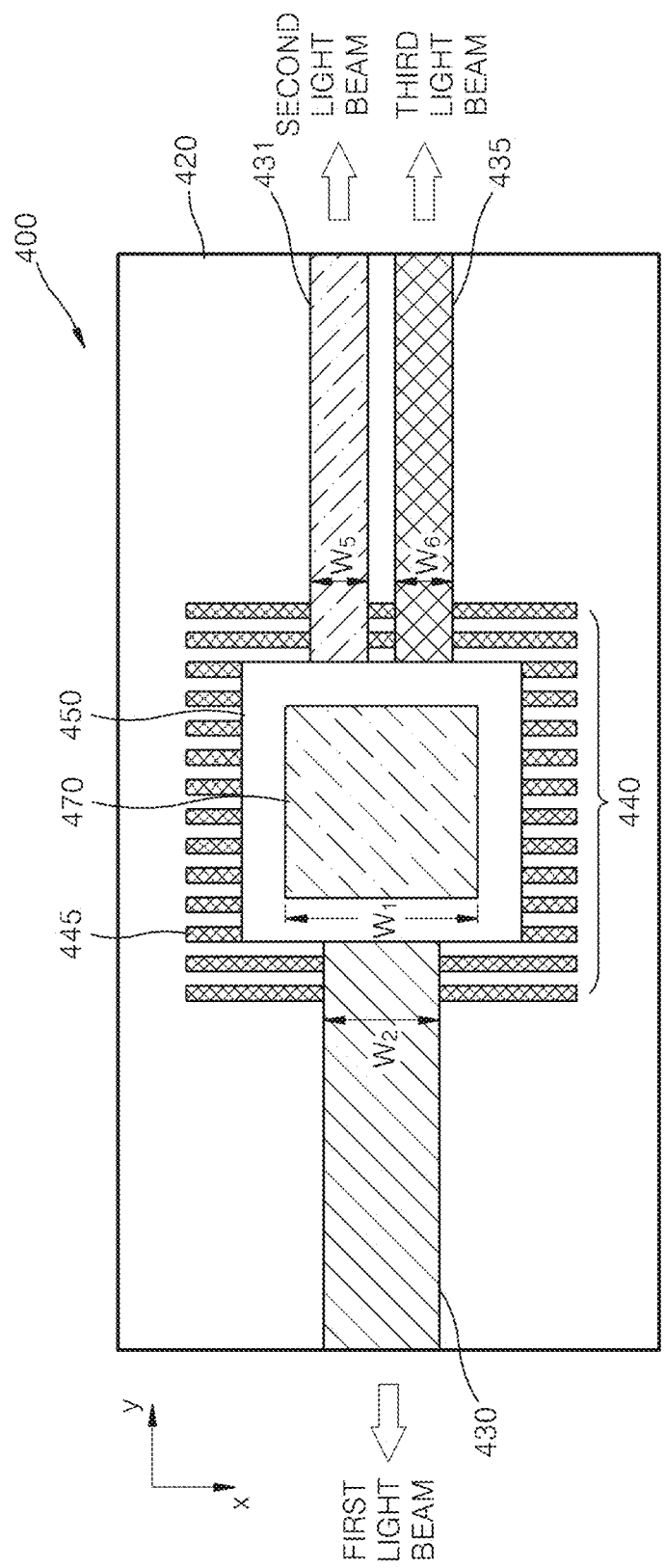

MULTI-PORT LIGHT SOURCES OF PHOTONIC INTEGRATED CIRCUITS

CROSS-REFERENCE TO RELATED APPLICATION(S)

This application claims priority from Korean Patent Application No. 10-2011-0113582, filed on Nov. 2, 2011, in the Korean Intellectual Property Office (KIPO), the entire contents of which are incorporated herein by reference.

BACKGROUND

1. Field

Example embodiments relate to multi-port light sources of photonic integrated circuits (PICs). Example embodiments also relate to multi-port light sources of PICs that include a plurality of waveguides.

2. Description of Related Art

When data is transmitted/received using high frequency bands, an electric connection using metal wires has a lot of transmission loss and requires a lot of electricity. In addition, when a transmission system is configured, it is difficult to design the system due to an electromagnetic interference (EMI) phenomenon.

On the other hand, an optical connection technology for transmitting data using light has less transmission loss and less EMI phenomenon compared to the electric connection, and thus, the optical connection technology may be applied to a wide bandwidth data transmission system having a high transmission speed. The optical connection technology is being widely used in the field of long distance optical communication, and recently has widely spread to local area and very short-range data transmission.

The optical communication system needs a photonic integrated circuit (PIC). The PIC is a photonic circuit in which optical devices performing various operations such as a light source, photo-detecting, optical amplification, and frequency filtering are integrated on a same substrate in order to transfer light to other places. Recently, research into a light source included in the PIC is being actively conducted.

SUMMARY

Provided are multi-port light sources of photonic integrated circuits (PICs).

Additional aspects will be set forth in part in the description which follows and, in part, will be apparent from the description, or may be learned by practice of example embodiments.

According to some example embodiments, a multi-port light source of a photonic integrated circuit (PIC), the multi-port light source includes: a light emission portion for generating light; and/or a plurality of waveguides disposed on opposite sides of the light emission portion to guide the light.

According to some example embodiments, the multi-port light source may further include: a substrate; and/or a first insulating layer formed on the substrate. The light emission portion and/or the plurality of waveguides may be disposed on the first insulating layer.

According to some example embodiments, the light emission portion may include: a first reflective layer; an active layer disposed on the first reflective layer; and/or a second reflective layer disposed on the active layer.

According to some example embodiments, the multi-port light source may further include a second insulating layer disposed between the first reflective layer and the active layer.

According to some example embodiments, the plurality of waveguides may be connected to the first reflective layer while overlapping the first reflective layer.

According to some example embodiments, the first reflective layer may include a plurality of bars that are separated from each other with desired (or alternatively, predetermined) intervals therebetween.

According to some example embodiments, the first reflective layer and/or the plurality of waveguides may include silicon.

According to some example embodiments, the second insulating layer may include silicon oxide material.

According to some example embodiments, the first reflective layer may include a high-index contrast grating (HCG) reflective layer.

According to some example embodiments, the plurality of waveguides may include: at least one first waveguide disposed on a first side of the light emission portion; and/or at least one second waveguide disposed on a second side of the light emission portion that faces the first side. The at least one first waveguide and the at least one second waveguide may be symmetrically disposed with respect to each other based on the light emission portion.

According to some example embodiments, the plurality of waveguides may include: at least one first waveguide disposed on a first side of the light emission portion; and/or at least one second waveguide disposed on a second side of the light emission portion that faces the first side. The at least one first waveguide and the at least one second waveguide may be asymmetrically disposed with respect to each other based on the light emission portion.

According to some example embodiments, a multi-port light source of a photonic integrated circuit (PIC), the multi-port light source includes: a first layer including a first pattern and a second pattern that are different from each other; an insulating layer disposed on at least a region of the first layer; an active layer disposed on at least a region of the insulating layer; and/or a reflective layer disposed on the active layer.

According to some example embodiments, the first pattern may include a plurality of first bars that are separated from each other with desired (or alternatively, predetermined) intervals therebetween.

According to some example embodiments, the second pattern may include second and third bars that are symmetrically disposed based on the active layer.

According to some example embodiments, the second pattern may include second and third bars that are asymmetrically disposed based on the active layer.

According to some example embodiments, the second pattern may be connected to the first pattern while overlapping the first pattern.

According to some example embodiments, the first layer may include silicon.

According to some example embodiments, the first layer may include a silicon device layer included in a silicon-on-insulator (SOI) substrate.

According to some example embodiments, the insulating layer and/or the active layer may be disposed on at least some regions of the first pattern.

According to some example embodiments, the first pattern may include a high-index contrast grating (HCG) reflective layer.

BRIEF DESCRIPTION OF THE DRAWINGS

The above and/or other aspects and advantages will become more apparent and more readily appreciated from the following detailed description of example embodiments, taken in conjunction with the accompanying drawings, in which:

FIG. 1A is a schematic plan view of a multi-port light source of a photonic integrated circuit (PIC) according to some example embodiments;

FIG. 4 is a schematic plan view of a multi-port light source of a PIC according to some example embodiments; and FIG. 5 is a schematic plan view of a multi-port light source of a PIC according to some example embodiments.

DETAILED DESCRIPTION

Figure 1B:
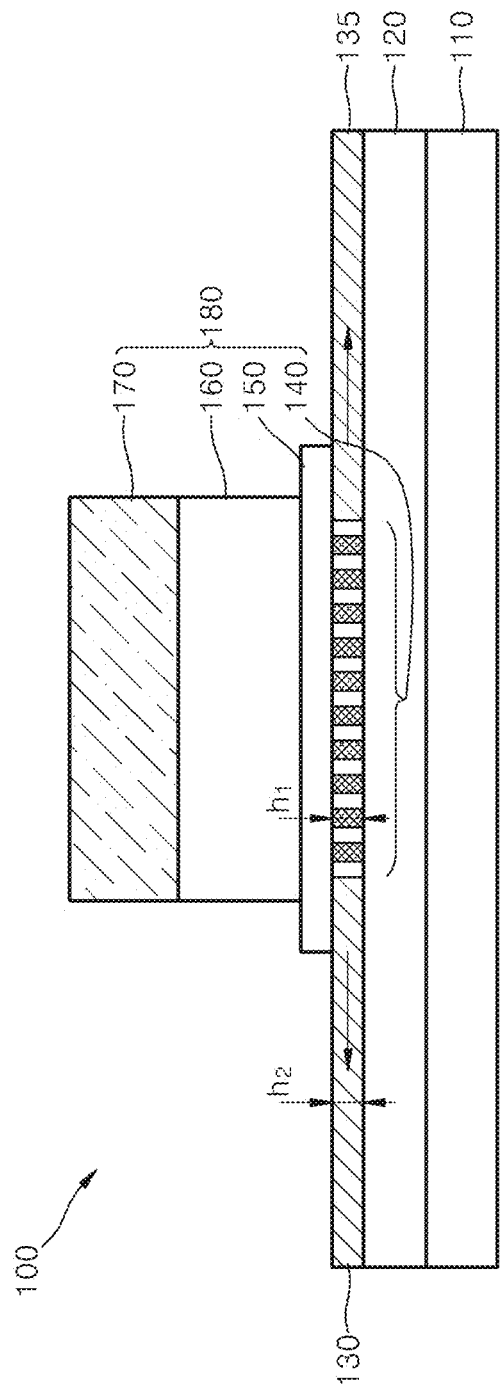
FIG. 1B is a schematic cross-sectional view of the multi-port light source of the PIC of FIG. 1A.

Example embodiments will now be described more fully with reference to the accompanying drawings. Embodiments, however, may be embodied in many different forms and should not be construed as being limited to the embodiments set forth herein. Rather, these example embodiments are provided so that this disclosure will be thorough and complete, and will fully convey the scope to those skilled in the art. In the drawings, the thicknesses of layers and regions may be exaggerated for clarity.

It will be understood that when an element is referred to as being "on," "connected to," "electrically connected to," or "coupled to" to another component, it may be directly on, connected to, electrically connected to, or coupled to the other component or intervening components may be present. In contrast, when a component is referred to as being "directly on," "directly connected to," "directly electrically connected to," or "directly coupled to" another component, there are no intervening components present. As used herein, the term "and/or" includes any and all combinations of one or more of the associated listed items.

It will be understood that although the terms first, second, third, etc., may be used herein to describe various elements, components, regions, layers, and/or sections, these elements, components, regions, layers, and/or sections should not be limited by these terms. These terms are only used to distinguish one element, component, region, layer, and/or section from another element, component, region, layer, and/or section. For example, a first element, component, region, layer, and/or section could be termed a second element, component, region, layer, and/or section without departing from the teachings of example embodiments.

Spatially relative terms, such as "beneath," "below," "lower," "above," "upper," and the like may be used herein for ease of description to describe the relationship of one component and/or feature to another component and/or feature, or other component(s) and/or feature(s), as illustrated in the drawings. It will be understood that the spatially relative terms are intended to encompass different orientations of the device in use or operation in addition to the orientation depicted in the figures.

The terminology used herein is for the purpose of describing particular example embodiments only and is not intended to be limiting of example embodiments. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

Reference will now be made to example embodiments, which are illustrated in the accompanying drawings, wherein like reference numerals may refer to like components throughout.

Figure 1C:
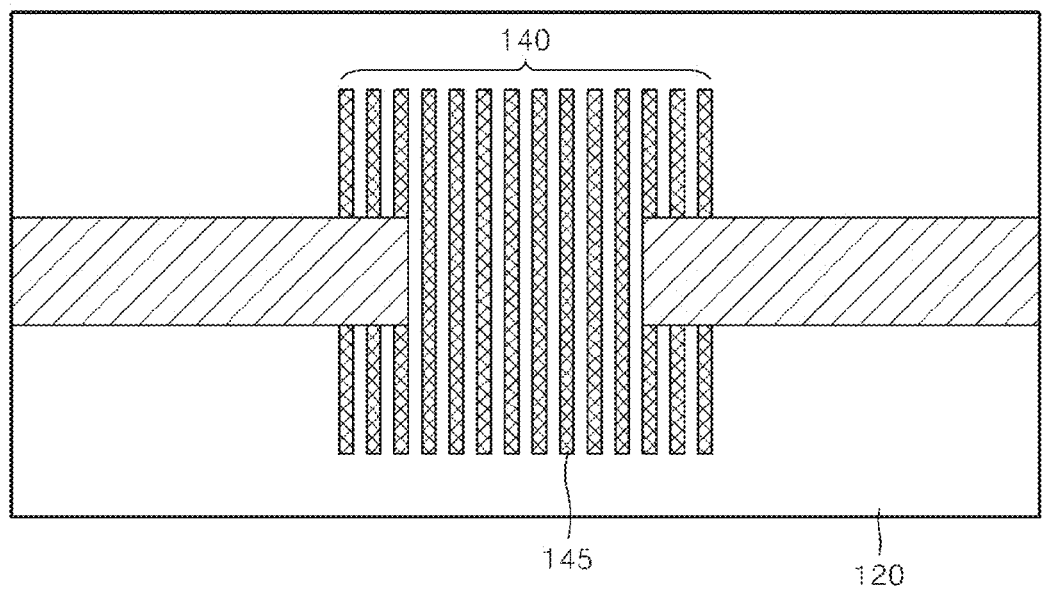
FIG. 1C is a plan view of the PIC of FIG. 1A.

FIG. 1A is a schematic plan view of a multi-port light source 100 of a photonic integrated circuit (PIC) according to some example embodiments, FIG. 1B is a schematic cross-sectional view of the multi-port light source 100 of the PIC of FIG. 1A, and FIG. 1C is a plan view of the PIC of FIG. 1A.

Referring to FIGS. 1A and 1B, the multi-port light source 100 includes a substrate 110, the first insulating layer 120 disposed on the substrate 110, a light emission portion 180 disposed on the first insulating layer 120 to emit light, and the first and second waveguides 130 and 135 connected to opposite sides of the light emission portion 180 to guide the light. The multi-port light source 100 may be applied to a PIC.

The substrate 110 may be a crystalline substrate and, for example, may be formed of Si or GaAs.

The first insulating layer 120 may be disposed on the substrate 110. The first insulating layer 120 may be formed of an insulating material including at least one of $ZrO_2$, $TiO_2$, $MgO$, $CeO_2$, $Al_2O_3$, $HfO_2$, $NbO$, $SiO_2$, and $Si_3N_4$. In addition, the insulating material forming the first insulating layer 120 may vary depending on characteristics of a material forming the first and second waveguides 130 and 135, and may have a refractive index that is less than that of the first and second waveguides 130 and 135.

The light emission portion 180 may include the first reflective layer 140 disposed on a portion of the first insulating layer 120 and reflecting light of a certain wavelength band, a second insulating layer 150 disposed on the first reflective layer 140, an active layer 160 disposed on the second insulating layer 150 and in which an optical resonance occurs to generate light, and a second reflective layer 170 disposed on the active layer 160 to reflect light of a certain wavelength band.

Referring to FIG. 1C, the first reflective layer 140 may be configured to have a structure, in which a plurality of first bars 145 are separated from each other with desired (or alternatively, predetermined) intervals therebetween. For example, the first reflective layer 140 may have a one-dimensional grating structure including a plurality of first bars 145. In addition, the plurality of first bars 145 may be formed of silicon. Due to the one-dimensional grating structure, light proceeding in a direction parallel with the substrate 110 may be excited in the first reflective layer 140. In addition, the excited light may be coupled to the first and second waveguides 130 and 135 disposed on opposite sides of the first reflective layer 140, and guided by the first and second waveguides 130 and 135 to be transmitted to other components in the PIC. The first reflective layer 140 may have high reflectivity by adjusting a grating period, widths and heights of the first bars 145, and thicknesses of the first and second insulating layers 120 and 150. For example, the first reflective layer 140 may have a reflectivity of about 99.8% or greater. On the other hand, the first reflective layer 140 may be a high-index contrast grating (HCG) reflective layer.

The second insulating layer 150 may overlap with the first reflective layer 140, and may overlap with some parts of the first and second waveguides 130 and 135 that will be described later. The second insulating layer 150 may be formed of a material having a refractive index that is lower than that of the first bars 145 in the first reflective layer 140 and that of the first and second waveguides 130 and 135. In order to achieve high reflectivity, the second insulating layer 150 having an appropriate thickness is necessary. The second insulating layer 150 prevents the active layer 160 and the first reflective layer 140 from being electrically connected to each other, and prevents the active layer 160 from being electrically connected to the first and second waveguides 130 and 135. In addition, the second insulating layer 150 may be formed of an insulating material including at least one of $ZrO_2$, $TiO_2$, $MgO$, $CeO_2$, $Al_2O_3$, $HfO_2$, $NbO$, $SiO_2$, and $Si_3N_4$.

The active layer 160 emits light having a desired (or alternatively, predetermined) energy level due to a recombination of electrons and holes, and may be formed of, for example, a III-IV group compound semiconductor. The active layer 160 may include a multiple quantum well (MQW) layer, in which quantum bather layers and quantum well layers are alternately stacked. The active layer 160 may be formed to a thickness resonating at a wavelength of about 1.31 μm or about 1.55 μm that is mainly used in an optical communication. The active layer 160 may be formed of GaAs, InP, GaInNAs, InGaAlAs, InGaAsP, AlGaInN, or AlGaAsSb. The second reflective layer 170 reflects the light emitted from the active layer 160 toward the first reflective layer 140 so that the light may resonate between the first and second reflective layers 140 and 170. The second reflective layer 170 may be a distributed Bragg reflector (DBR) layer that is designed to have the greatest reflectivity at a resonant wavelength ($\lambda$) of the light. The second reflective layer 170 may include a structure, in which two different semiconductor layers having different refractive indexes from each other are alternately stacked to a thickness of about ¼ of the wavelength (that is, $\lambda/4$) of the light in a medium. For example, the DBR reflective layer may be formed by alternately stacking $Al_xGa_{(1-x)}As$ layers and $Al_yGa_{(1-y)}As$ layers (here, $0 \leq x$, $y \leq 1$, $x \neq y$), each having a thickness of about $\lambda/4$. Otherwise, the second reflective layer 170 may be the HCG reflective layer, like the first reflective layer 140.

A plurality of waveguides may be disposed on opposite sides of the light emission portion 180, and the plurality of waveguides may include at least one first waveguide 130 and at least one second waveguide 135. The at least one first waveguide 130 may be disposed on a first side of the light emission portion 180, and the at least one second waveguide 135 may be disposed on a second side of the light emission portion 180, which faces the first side. The first and second waveguides 130 and 135 may be disposed symmetrically based on the light emission portion 180. For example, the number and structures of the first and second waveguides 130 and 135 may be equal to each other. In addition, the first and second waveguides 130 and 135 may be disposed perpendicularly to the light emission portion 180 or be inclined with respect to the light emission portion 180. The first and second waveguides 130 and 135 may be extended from the first reflective layer 140 on a portion of the first insulating layer 120. The first and second waveguides 130 and 135 may be formed of, for example, silicon. The light proceeding in the direction parallel with the substrate 110 from the light emission portion 180 may be incident into the first and second waveguides 130 and 135, and the first and second waveguides 130 and 135 may transmit the light to outside.

Therefore, the multi-port light source 100 may supply a plurality of light beams to optical devices or optical circuits simultaneously. Here, the plurality of light beams emitted from the multi-port light source 100 may have the same optical characteristics. For example, the plurality of light beams emitted from the multi-port light source 100 may have the same optical modes (for example, single mode or multiple mode) as each other. In addition, the multi-port light source 100 integrates and modulates the light and transmits the light beams of the same signal to different spots at the same time, or may transmit the light beams of different signals to different spots at the same time after indirectly modulating the plurality of light beams through an optical modulator. On the other hand, the plurality of light beams emitted from the multi-port light source 100 may have coherence with each other, and the plurality of light beams may be combined together by an optical coupler.

Widths $w2$ of the first and second waveguides 130 and 135 may be constant, and the width $w2$ may be equal to or less than a width $w1$ of the active layer 160. For example, the width $w2$ of the first and second waveguides 130 and 135 may guide the light of multiple modes or a single mode. In order to maximize the incident light, a height $h2$ of the first and second waveguides 130 and 135 may be equal to a height $h1$ of the first reflective layer 140, and the width $w2$ of the first and second waveguides 130 and 135 may be equal to or less than the width $w1$ of the active layer 160. In addition, the width $w2$ of the first and second waveguides 130 and 135 may be equal to or greater than ½ of the width $w1$ of the active layer 160 and equal to or less than the width $w1$. Otherwise, the width $w2$ of the first and second waveguides 130 and 135 may be greater than the width $w1$ of the active layer 160.

On the other hand, a silicon-on-insulator (SOI) substrate may be used to form the substrate 110, the first insulating layer 120, the first reflective layer 140, and the first and second waveguides 130 and 135. Here, the SOI substrate may include a handle wafer formed of silicon, an insulating layer formed of a silicon oxide and disposed on the handle wafer, and a silicon device layer disposed on the insulating layer. For example, the silicon device layer in the SOI substrate may be patterned into a first pattern forming the first reflective layer 140 and a second pattern forming the first and second waveguides 130 and 135. The first pattern includes the plurality of first bars 145 having narrow widths, and the second pattern may include second and third bars (of the first and second waveguides 130 and 135) respectively having wider widths than the first bars 145 of the first pattern. In addition, at least some of the plurality of first bars 145 may be connected to the second and third bars (of the first and second waveguides 130 and 135). Also, at least some of the first bars 145 may be perpendicular to the second and third bars (of the first and second waveguides 130 and 135). As described above, the first reflective layer 140 of the light emission portion 180 and the first and second waveguides 130 and 135 may be formed simultaneously by using the SOI substrate, and thus, the multi-port light source 100 may be easily manufactured.

The active layer 160 may be formed by stacking a III-V group compound semiconductor. The active layer 160 may be bonded to the first reflective layer 140 and the first and second waveguides 130 and 135 formed of silicon while interposing the second insulating layer 150 having the refractive index that is lower than that of the first bars 145 of the first reflective layer 140 and the first and second waveguides 130 and 135 therebetween, by using a wafer bonding technology. The wafer bonding technology may be executed in such a manner that a thermal stress caused by a difference between thermal expansion coefficients of the active layer 160 and the first reflective layer 140 (for example, an oxygen plasma bonding process) is reduced.

The second insulating layer 150 having an appropriate thickness increases the reflectivity, and blocks an operating current of the active layer 160 from being induced in the first reflective layer 140 and the first and second waveguides 130 and 135. Thus, leakage of the operating current and power consumption may be reduced.

Figure 2:
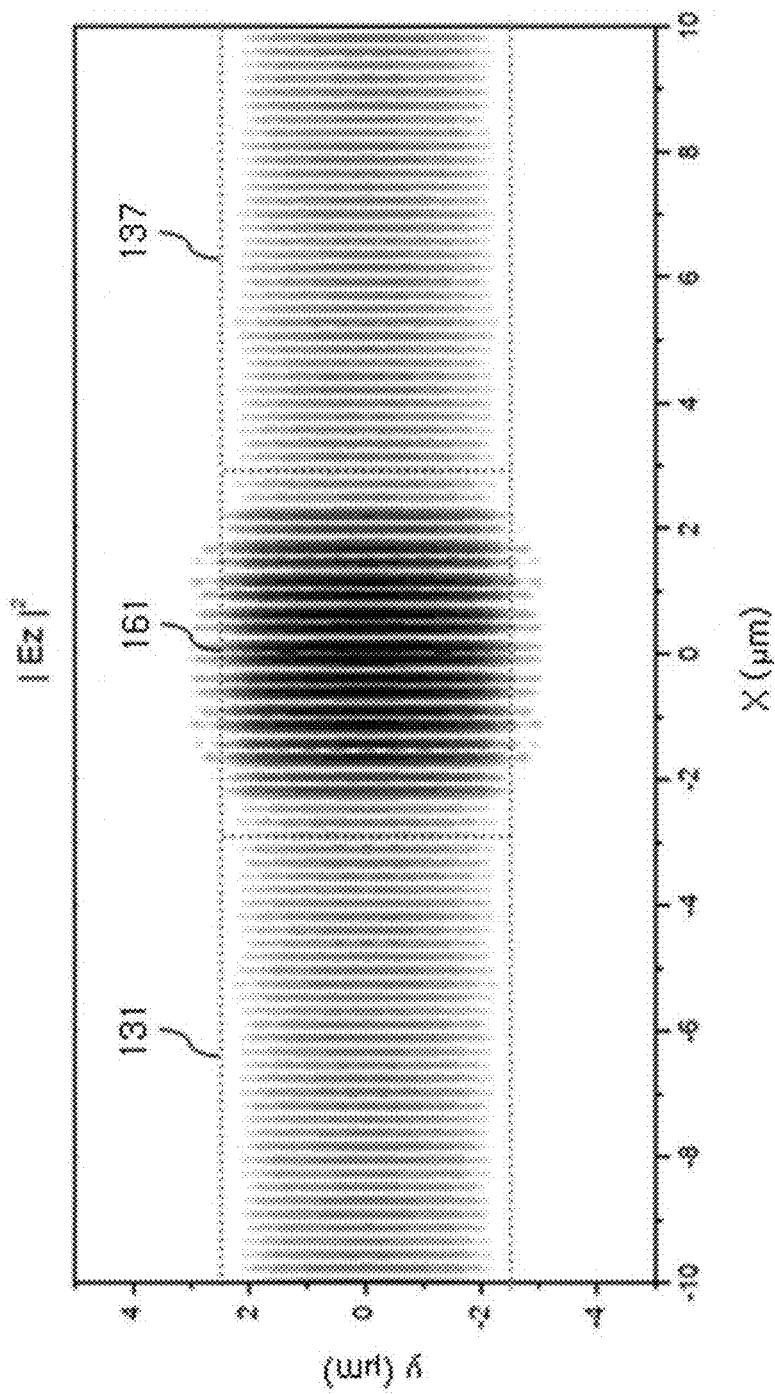
FIG. 2 is a diagram showing a finite-difference time-domain (FDTD) simulation result of the multi-port light source in the PIC, and showing $|Ez|^2$ distribution in a high-index contrast grating (HCG) reflective layer and the first and second waveguides.

FIG. 2 shows a finite-difference time-domain (FDTD) simulation result of the multi-port light source 100 of the PIC of FIG. 1A, and shows a $|Ez|^2$ distribution in the first reflective layer 140 and a center of the first and second waveguides 130 and 135.

In the FDTD simulation, the multi-port light source 100 is formed on the SOI substrate. The first insulating layer 120 is formed of $SiO_2$ to a thickness of about 1 μm, and the first reflective layer 140 is the HCG reflective layer, in which a grating period is about 0.515 μm, a width of the first bar 145 (silicon) is about 0.309 μm, and a height of the first bar 145 is about 0.355 μm. The second insulating layer 150 formed of a silicon oxide material is disposed on the first reflective layer 140 to a thickness of about 0.183 μm, the active layer 160 and the second reflective layer 170, which have a length of about 5 μm in an x-axis direction and a length of about 5 μm in a y-axis direction, are disposed in parallel with the substrate 110. The second reflective layer 170 is DBR reflective layer. The active layer 160 has a vertical optical cavity structure, which resonates the light having a wavelength of about 1.31 μm in a direction parallel with the substrate 110 between the second reflective layer 170 and the first reflective layer 140. The first reflective layer 140 is designed to have a reflectivity of about 99.89% with respect to the light that is polarized perpendicularly to the first bars 145 (that is, the x-axis direction) among the light beams having the wavelength of about 1.31 μm incident onto the first reflective layer 140. In addition, the second reflective layer 170 is designed to have a reflectivity of about 99.98% with respect to the light incident into the second reflective layer 170 perpendicularly, without regard to the polarization direction.

Referring to FIG. 2, a first region 161 denoted by dotted lines is a region corresponding to the light emission portion 180, and second and third regions 131 and 137 respectively correspond to the first and second waveguides 130 and 135. Since $|Ez|^2$ is distributed in the second and third regions 131 and 137, it may be identified that the light excited in the first reflective layer 140 is coupled and propagated to the first and second waveguides 130 and 135. In addition, a size of an optical mode of the light excited in the first reflective layer 140 corresponds to the width of the active layer 160, and thus, the size of the optical mode of the light excited in the first reflective layer 140 is determined by the width of the active layer 160.

On the other hand, a coupling efficiency is a value representing a coupling degree of the light emitted from the light emission portion 180 to the first and second waveguides 130 and 135. When the coupling efficiency is low, the light may not be transferred to the first and second waveguides 130 and 135, and the light is discharged in a direction perpendicular to the substrate 110. Since the first reflective layer 140 has the one-dimensional grating structure, the first reflective layer 140 may excite the optical components of the light proceeding in parallel with the substrate 110. When the light proceeding in parallel with the substrate 110 is sufficiently coupled to the first and second waveguides 130 and 135, high coupling efficiency may be obtained. The coupling efficiency obtained through the FDTD simulation in each of the first and second waveguides 130 and 135 is about 21%, and a total coupling efficiency of the multi-port light source 100 is about 42%. In the FDTD simulation, the coupling efficiency of a single-port light source is about 32%, and thus, it is identified that the coupling efficiency of the multi-port light source 100 is improved.

Figure 3:
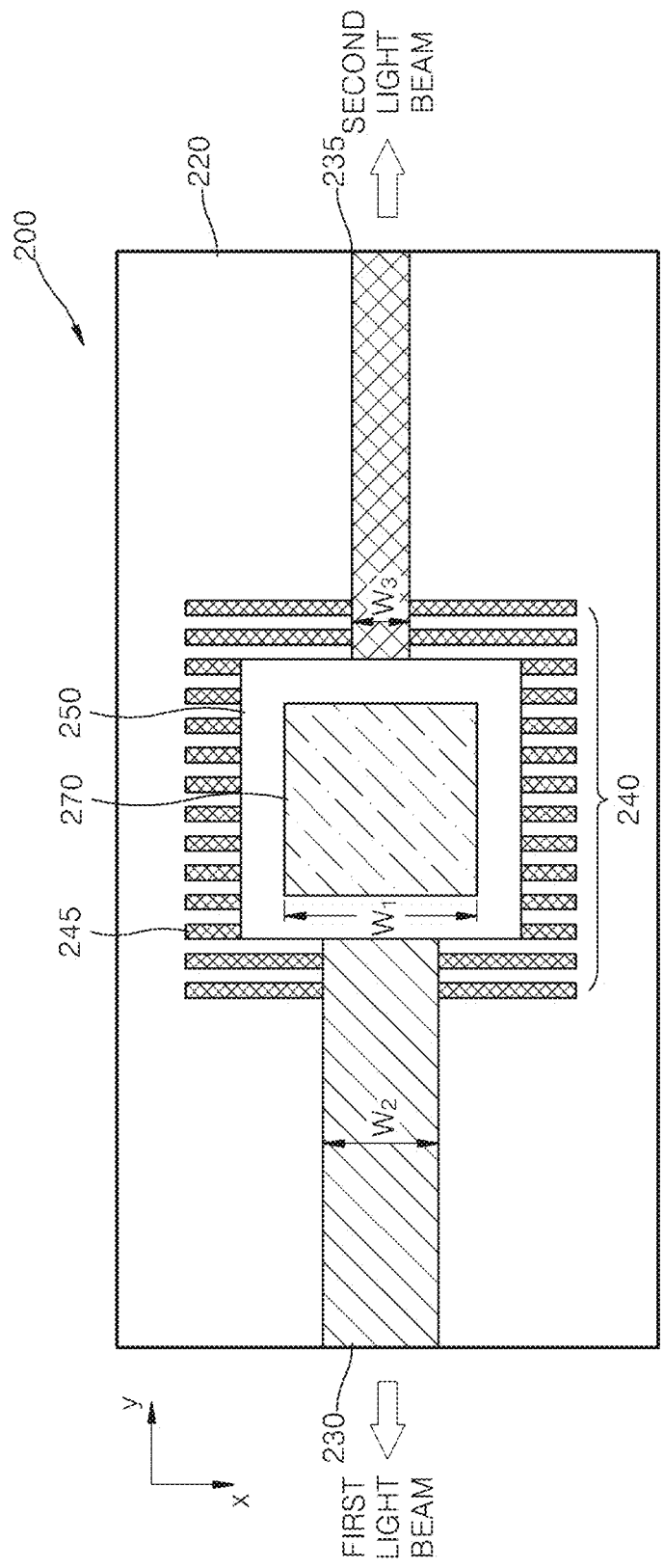
FIG. 3 is a schematic plan view of a multi-port light source of a PIC according to some example embodiments.

FIG. 3 is a schematic plan view of a multi-port light source 200 of a PIC according to some example embodiments. Differences of the multi-port light source 200 from the multi-port light source 100 will be described in more detail below.

Referring to FIG. 3, the multi-port light source 200 may include a substrate (not shown), a first insulating layer 220 disposed on the substrate, a light emission portion (not shown) disposed on the first insulting layer 220 to generate light, and a first waveguide 230 and a second waveguide 235 connected to opposite sides of the light emission portion (not shown) to guide lights. The multi-port light source 200 may be applied to a PIC.

The light emission portion may include a first reflective layer 240 disposed on a portion of the first insulating layer 220 to reflect the light of a certain wavelength band, a second insulating layer 250 disposed on the first reflective layer 240, an active layer (not shown) disposed on the second insulating layer 250 and generating light resonance and generating light, and a second reflective layer 270 disposed on the active layer to reflect the light of a certain wavelength band.

The first reflective layer 240 may include a structure, in which a plurality of first bars 245 are separated from each other with desired (or alternatively, predetermined) intervals therebetween. For example, the first reflective layer 240 may be a one-dimensional grating structure including the plurality of first bars 245. The plurality of first bars 245 may be formed of silicon. Due to the one-dimensional grating structure, the light proceeding in parallel with the substrate may be excited in the first reflective layer 240. In addition, the excited light is coupled to the first and second waveguides 230 and 235 disposed on the opposite sides of the first reflective layer 240, and guided by the first and second waveguides 230 and 235 to be transferred to other components of the PIC. On the other hand, the first reflective layer 240 may be an HCG reflective layer.

The second insulating layer 250 may overlap with the first reflective layer 240, and may overlap with regions of the first and second waveguides 230 and 235, which will be described later. The second insulating layer 250 may be formed of a material having a refractive index that is lower than that of the first bars 245 of the first reflective layer 240 and the first and second waveguides 230 and 235. In addition, the second insulating layer 250 needs to have an appropriate thickness in order to achieve high reflectivity. The second insulating layer 250 may be formed of, for example, a silicon oxide material.

The second reflective layer 270 reflects the light generated by the active layer toward the first reflective layer 240 so that the light may be resonated between the first reflective layer 240 and the second reflective layer 270. The second reflective layer 270 may be a DBR reflective layer designed to have the largest reflectivity at a resonance wavelength (λ) of the light.

A plurality of waveguides may be disposed on opposite sides of the light emission portion. For example, at least one first waveguide 230 may be disposed on a first side of the light emission portion, and at least one second waveguide 235 may be disposed on a second side, which faces the first side, of the light emission portion. The first and second waveguides 230 and 235 may be extended from the first reflective layer 240 on a portion of the first insulating layer 220. The first and second waveguides 230 and 235 may be formed of, for example, silicon. The light proceeding from the light emission portion in parallel with the substrate may be incident into the first and second waveguides 230 and 235, and the first and second waveguides 230 and 235 may transfer the light to outside.

In addition, the first and second waveguides 230 and 235 may be asymmetrically formed with respect to each other based on the light emission portion. For example, a width w2 of the first waveguide 230 may be greater than a width w3 of the second waveguide 235. Therefore, the multi-port light source 200 may supply a plurality of light beams simultaneously to the optical devices or optical circuits. Here, the plurality of light beams emitted from the multi-port light source 200 may have different optical characteristics from each other. For example, a first light beam and a second light beam emitted from the first and second waveguides 230 and 235 may have different optical modes from each other.

Widths w2 and w3 of the first and second waveguides 230 and 235 may be constant, and the widths w2 and w3 may be equal to or less than a width w1 of the active layer. For example, the first and second waveguides 230 and 235 may have the widths w2 and w3, through which the light of a multi mode or a single mode may be guided. In order to increase the incident light, a height h2 of the first and second waveguides 230 and 235 may be equal to a height h1 of the first reflective layer 240, and the widths w2 and w3 of the first and second waveguides 230 and 235 may be equal to or less than the width w1 of the active layer. In addition, the widths w2 and w3 of the first and second waveguides 230 and 235 may be equal to or greater than ½ of the width w1 of the active layer, and equal to or less than the width w1. Also, the widths w2 and w3 of the first and second waveguides 230 and 235 may be greater than the width w1 of the active layer.

In addition, a SOI substrate may be used to form the first insulating layer 220, the first reflective layer 240, and the first and second waveguides 230 and 235. For example, a silicon device layer in the SOI substrate may be patterned into a first pattern for forming the first reflective layer 240 and a second pattern for forming the first and second waveguides 230 and 235. The first pattern may include a plurality of first bars 245 having narrower widths, and the second pattern may include a second and third bars (of the first and second waveguides 230 and 235) respectively having wider width than the first pattern. In addition, at least some of the first bars 245 may be connected to the second and third bars (of the first and second waveguides 230 and 235). As described above, the first reflective layer 240 and the first and second waveguides 230 and 235 may be formed simultaneously by using the SOI substrate, and the multi-port light source 200 may be easily manufactured.

FIG. 4 is a schematic plan view of a multi-port light source 300 of a PIC according to some example embodiments. Differences of the multi-port light source 300 from the multi-port light sources 100 and 200 described above will be described below.

Referring to FIG. 4, the multi-port light source 300 may include a substrate (not shown), a first insulating layer 320 disposed on the substrate, a light emission portion disposed on the first insulating layer 320 to generate light, and a first waveguide 330 and a second waveguide 335 that are connected to opposite sides of the light emission portion to guide light. The multi-port light source 300 may be applied to a PIC.

The light emission portion may include a first reflective layer 340 disposed on a portion of the first insulating layer 320 to reflect the light of a certain wavelength band, a second insulating layer 350 disposed on the first reflective layer 340, an active layer (not shown) disposed on the second insulating layer 350 and generating light resonance and generating light, and a second reflective layer 370 disposed on the active layer to reflect the light of a certain wavelength band. The first reflective layer 340 may include a plurality of first bars 345.

A plurality of waveguides may be disposed on opposite sides of the light emission portion. For example, at least one first waveguide 330 may be disposed on a first side of the light emission portion, and at least one second waveguide 335 may be disposed on a second side, which faces the first side, of the light emission portion. The first and second waveguides 330 and 335 may be extended from the first reflective layer 340 on a portion of the first insulating layer 320. The first and second waveguides 330 and 335 may be formed of, for example, silicon. The light proceeding from the light emission portion in parallel with the substrate may be incident into the first and second waveguides 330 and 335, and the first and second waveguides 330 and 335 may transfer the light to outside.

In addition, the first and second waveguides 330 and 335 may be asymmetrically formed with respect to each other based on the light emission portion. The first and second waveguides 330 and 335 may have different sizes and different structures from each other. For example, a width w2 of the first waveguide 330 may be constant, while a width of the second waveguide 335 may be variable to w, w2, and w3. The width w2 of the first waveguide 330 is constant and may be equal to or less than a width w1 of the active layer. In addition, the constant width w2 of the first waveguide 330 may be greater than the width w1 of the active layer. On the other hand, a width w2 of the second waveguide 335 at an inlet side 334 may be greater than the width w3 at an outlet side 336.

The second waveguide 335 may include, for example, a 2-1 waveguide 331 coupling the light emitted from the light emission portion to the second waveguide 335 to guide the light, a 2-2 waveguide 332 having a width gradually reduced to change a size of the optical mode, and a 2-3 waveguide 333 for guiding the light in the changed optical mode size.

The width w2 of the 2-1 waveguide 331 is constant, and the width w2 may be equal to or less than the width w1 of the active layer. In addition, the width w2 may be greater than the width w1 of the active layer. For example, light of multi-mode may be guided through the width w2 of the 2-1 waveguide 331. The width w4 at a side of the 2-2 waveguide 332 is equal to the width w2 of the 2-1 waveguide 331, and the width w4 may be continuously reduced until the width w4 at the other side of the 2-2 waveguide 332 is equal to the width w3 of the 2-3 waveguide 333. For example, the width w4 of the 2-2 waveguide 332 may be the width for changing the light of the multi-mode into the single mode. In addition, the width w3 of the 2-3 waveguide 333 may be equal to a width of a component of the PIC, which is connected to the 2-3 waveguide 333. For example, the width w3 of the 2-3 waveguide 333 may be the width for guiding the light of the single mode. In FIG. 4, the width of the second waveguide 335 is reduced discontinuously; however, example embodiments are not limited thereto. The width of the second waveguide 335 may be continuously reduced from the inlet side 334 toward the outlet side 336.

Therefore, the multi-port light source 300 of some example embodiments may supply a plurality of light beams to optical devices or optical circuits simultaneously. The plurality of light beams emitted from the multi-port light source 300 may have different optical characteristics from each other. For example, a first light beam and a second light beam emitted from the first and second waveguides 330 and 335 may have different optical modes from each other.

FIG. 5 is a schematic plan view of a multi-port light source 400 according to some example embodiments. Differences of the multi-port light source 400 from the multi-port light sources 100, 200, and 300 according to the previous example embodiments will be described below.

Referring to FIG. 5, the multi-port light source 400 may include a substrate (not shown), a first insulating layer 420 disposed on the substrate, a light emission portion (not shown) disposed on the first insulating layer 420 to generate light, and first through third waveguides 430, 431, and 435 connected to opposite sides of the light emission portion to guide the light. The multi-port light source 400 may be applied to a PIC.

The light emission portion may include a first reflective layer 440 disposed on a region of the first insulating layer 420 to reflect light of a certain wavelength band, a second insulating layer 450 disposed on the first reflective layer 440, an active layer (not shown) disposed on the second insulating layer 450 to generate light resonance and generate light, and a second reflective layer 470 disposed on the active layer to reflect light of a certain wavelength band. The first reflective layer 440 may include a plurality of first bars 445.

A plurality of waveguides are disposed on opposite sides of the light emission portion. For example, the first waveguide 430 may be disposed at a first side of the light emission portion, and the second and third waveguides 431 and 435 may be disposed on a second side facing the first side of the light emission portion. The first through third waveguides 430, 431, and 435 may be extended from the first reflective layer 440 on a region of the first insulating layer 420. The first through third waveguides 430, 431, and 435 may be formed of, for example, silicon. The light proceeding in parallel with the substrate from the light emission portion may be incident into each of the first through third waveguides 430, 431, and 435, and the first through third waveguides 430, 431, and 435 may transfer the light to outside.

The first through third waveguides 430, 431, and 435 may be asymmetrically disposed with respect to each other based on the light emission portion. The first through third waveguides 430, 431, and 435 may have different structures and sizes from each other. For example, a width w2 of the first waveguide 430 may be different from widths w5 and w6 of the second and third waveguides 431 and 435. In addition, the width w5 of the second waveguide 431 may be different from the width w6 of the third waveguide 435.

The widths w2, w5, and w6 of the first through third waveguides 430, 431, and 435 may be constant, and may be equal to or less than a width w1 of the active layer. For example, the widths w2, w5, and w6 of the first through third waveguides 430, 431, and 435 may guide the light of multi-mode or single mode. In order to increase the incident light, a height h2 of the first through third waveguides 430, 431, and 435 may be equal to a height h1 of the first reflective layer 440, and the widths w2, w5, and w6 of the first through third waveguides 430, 431, and 435 may be equal to or less than the width w1 of the active layer. In addition, the widths w2, w5, and w6 of the first through third waveguides 430, 431, and 435 may be equal to or greater than ½ of the width w1 of the active layer, and may be equal to or less than the width w1. The width w2 of the first waveguide 430 may be greater than the width w1 of the active layer.

Therefore, the multi-port light source 400 may supply a plurality of light beams to optical devices or optical circuits simultaneously, and the plurality of light beams emitted from the multi-port light source 400 may have different optical characteristics. For example, first through third light beams emitted from the first through third waveguides 430, 431, and 435 may have different optical modes from each other.

According to some example embodiments of the multi-port light source of the PIC, the plurality of light beams may be supplied from one light source to the plurality of waveguides. When the multi-port light source of the PIC has the waveguides that are the same as each other, the plurality of light beams having the same optical characteristics may be supplied to the plurality of optical circuits and optical devices. Otherwise, when the multi-port light source of the PIC has the waveguides that are different from each other, the plurality of light beams having different optical characteristics may be supplied to the plurality of optical devices and optical circuits.

While example embodiments have been particularly shown and described, it will be understood by those of ordinary skill in the art that various changes in form and details may be made therein without departing from the spirit and scope of the present invention as defined by the following claims.

What is claimed is:

1. A multi-port light source of a photonic integrated circuit (PIC), the multi-port light source comprising:
 a light emission portion configured to generate light; and
 a plurality of waveguides operatively connected to opposite sides of the light emission portion to guide the light;
 wherein the light emission portion comprises:
  a first reflective layer; and
  an active layer on the first reflective layer; and
 wherein the active layer is configured to accommodate optical resonance to generate the light.

2. The multi-port light source of claim 1, further comprising:
 a substrate; and
 a first insulating layer on the substrate;
 wherein the light emission portion and the plurality of waveguides are on the first insulating layer.

3. The multi-port light source of claim 1, further comprising:
 a second reflective layer on the active layer.

4. The multi-port light source of claim 1, further comprising:
 a substrate;
 a first insulating layer on the substrate;
 the first reflective layer on the first insulating layer;
 a second insulating layer on the first reflective layer; and
 a second reflective layer on the active layer.

5. The multi-port light source of claim 1, wherein the plurality of waveguides are connected to the first reflective layer while overlapping the first reflective layer.

6. The multi-port light source of claim 1, wherein the first reflective layer comprises a plurality of bars that are separated from each other with intervals between the bars.

7. The multi-port light source of claim 1, wherein the first reflective layer and the plurality of waveguides comprise silicon.

8. The multi-port light source of claim 4, wherein the second insulating layer comprises silicon oxide material.

9. The multi-port light source of claim 1, wherein the first reflective layer comprises a high-index contrast grating (HCG) reflective layer.

10. The multi-port light source of claim 1, wherein the plurality of waveguides comprises:
 at least one first waveguide on a first side of the light emission portion; and at least one second waveguide on a second side of the light emission portion that faces the first side;

wherein the at least one first waveguide and the at least one second waveguide are symmetrical with respect to each other based on the light emission portion.

11. The multi-port light source of claim 1, wherein the plurality of waveguides comprises:

at least one first waveguide on a first side of the light emission portion; and at least one second waveguide on a second side of the light emission portion that faces the first side;

wherein the at least one first waveguide and the at least one second waveguide are asymmetrical with respect to each other based on the light emission portion.

12. A multi-port light source of a photonic integrated circuit (PIC), the multi-port light source comprising:

a first layer including a first pattern and a second pattern that are different from each other;

an insulating layer on at least a region of the first layer;

an active layer, in which optical resonance occurs to generate light, on at least a region of the insulating layer; and a reflective layer on the active layer.

13. The multi-port light source of claim 12, wherein the first pattern comprises a plurality of first bars that are separated from each other with intervals between the first bars.

14. The multi-port light source of claim 12, wherein the second pattern comprises second and third bars that are symmetrical based on the active layer.

15. The multi-port light source of claim 12, wherein the second pattern comprises second and third bars that are asymmetrical based on the active layer.

16. The multi-port light source of claim 12, wherein the second pattern is connected to the first pattern while overlapping the first pattern.

17. The multi-port light source of claim 12, wherein the first layer comprises silicon.

18. The multi-port light source of claim 12, wherein the first layer comprises a silicon device layer included in a silicon-on-insulator (SOI) substrate.

19. The multi-port light source of claim 12, wherein the insulating layer and the active layer are on at least some regions of the first pattern.

20. The multi-port light source of claim 12, wherein the first pattern comprises a high-index contrast grating (HCG) reflective layer.

* * * * *